US012627194B2

(12) United States Patent
Lee et al.

(10) Patent No.: US 12,627,194 B2
(45) Date of Patent: May 12, 2026

(54) COOLING CHANNEL STRUCTURE OF A MOTOR

(71) Applicants: HYUNDAI MOTOR COMPANY, Seoul (KR); KIA CORPORATION, Seoul (KR)

(72) Inventors: Kam Chun Lee, Seoul (KR); Jae Young Jeun, Yongin-si (KR); Jeong Uk An, Suwon-si (KR); Ki Tack Lim, Incheon (KR); Kyung Jun Lee, Seoul (KR); Yong Gyu Lee, Yongin-si (KR); Sung Min Hong, Seongnam-si (KR); Hong Wook Lee, Seongnam-si (KR); Kyung Ku Yeo, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 265 days.

(21) Appl. No.: 18/216,773

(22) Filed: Jun. 30, 2023

(65) Prior Publication Data

US 2024/0154489 A1 May 9, 2024

(30) Foreign Application Priority Data

Nov. 7, 2022 (KR) ......................... 10-2022-0146702

(51) Int. Cl.
*H02K 5/20* (2006.01)
*H02K 15/12* (2025.01)
*H02K 15/14* (2025.01)

(52) U.S. Cl.
CPC ............... *H02K 5/20* (2013.01); *H02K 15/12* (2013.01); *H02K 15/14* (2013.01)

(58) Field of Classification Search
CPC .... H02K 15/12; H02K 15/14; H02K 2205/09; H02K 5/20; H02K 5/203
See application file for complete search history.

(56) References Cited

U.S. PATENT DOCUMENTS

| | | | |
|---|---|---|---|
| 8,736,119 B2 | 5/2014 | Iwamoto et al. | |
| 2012/0267969 A1 | 10/2012 | Iwamoto et al. | |
| 2020/0153291 A1 | 5/2020 | Van Der Wal | |
| 2021/0194298 A1 | 6/2021 | Söntgerath et al. | |
| 2021/0384806 A1* | 12/2021 | Hung ...................... | B22C 9/103 |

FOREIGN PATENT DOCUMENTS

| | | |
|---|---|---|
| CN | 103475159 B | 8/2017 |
| JP | 2006060914 A | 3/2006 |
| JP | 2012228105 A | 11/2012 |
| JP | 2017135844 A | 8/2017 |
| JP | 2020188527 A | 11/2020 |
| JP | 2021100369 A | 7/2021 |
| KR | 101454308 B1 | 10/2014 |

* cited by examiner

*Primary Examiner* — Christopher M Koehler
*Assistant Examiner* — Ethan Nguyen Vo
(74) *Attorney, Agent, or Firm* — Lempia Summerfield Katz LLC

(57) ABSTRACT

A channel structure includes a cooling channel continuously formed inside a housing. A coolant is configured to flow in the cooling channel. The cooling channel includes a plurality of channel portions spaced apart from each other and extending in the housing by changing directions.

10 Claims, 10 Drawing Sheets

COOLING CHANNEL STRUCTURE OF A MOTOR

CROSS-REFERENCE TO RELATED APPLICATION

The present application claims priority to Korean Patent Application No. 10-2022-0146702, filed Nov. 7, 2022, the entire contents of which are incorporated herein by reference.

BACKGROUND

Technical Field

The present disclosure relates, generally, to the cooling of a motor and, more particularly, to the cooling of an in-wheel motor.

Description of the Related Art

The statements in this section merely provide background information related to the present disclosure and may not constitute prior art.

Recently, electric vehicles powered by a motor in place of an engine have come into prominence. Although electric vehicles have been configured to be generally powered by one or two large motors, in-wheel motors widely used in small vehicles, such as electric bicycles and scooters, are being introduced to electric vehicles.

In-wheel motors are electric motors mounted inside a wheel of a vehicle to directly rotate the wheel. Specifically, in an electric vehicle powered by in-wheel motors, small motors may be mounted inside the wheels, respectively, to independently control and drive the respective wheels.

An electric vehicle to which in-wheel motors are applied may be advantageous in terms of space utilization, improved controllability, and the like, compared to conventional electric vehicles using a large motor. However, considering the characteristics of an in-wheel motor electric vehicle provided with in-wheel motors inside the wheels, the electric vehicle driven by the in-wheel motor is required to meet several design requirements different from those of electric vehicles powered by a single large motor.

The foregoing is intended merely to aid in understanding the background of the present disclosure. The foregoing is not intended to mean that the present disclosure falls within the purview of the related art that is already known to those having ordinary skill in the art.

SUMMARY

Accordingly, the present disclosure has been made keeping in mind the above problems occurring in the related art. The present disclosure proposes a cooling structure able to optimize the cooling performance of a motor.

The objective of the present disclosure is not limited to the aforementioned description, and other objectives not explicitly disclosed herein should be clearly understood by those having ordinary skill in the art from the description provided hereinafter.

In order to achieve at least one of the above objectives and carry out the following characteristic functions of the present disclosure, the present disclosure has the following features.

According to an embodiment of the present disclosure, a channel structure of a motor may include a cooling channel formed in a housing and configured to enable coolant to flow therethrough. The cooling channel extends by changing direction in the housing and includes a plurality of channel portions that are spaced apart from each other. The channel portions are continuously connected to each other to form the cooling channel.

According to the embodiments of the present disclosure, a method of fabricating a housing may include forming a core of a cooling channel continuously provided inside the housing. The cooling channel includes a plurality of channel portions spaced apart from each other and extending by changing directions. The method of fabricating a housing may further include casting the housing by placing the core inside a mold, and demolding the core.

According to the present disclosure, the cooling structure can optimize the cooling performance of a motor.

Effects obtainable from the present disclosure are not limited to the aforementioned effects. Furthermore, other effects not explicitly disclosed herein should be clearly understood by those having ordinary skill in the art from the description provided hereinafter.

BRIEF DESCRIPTION OF THE DRAWINGS

The above and other objectives, features, and other advantages of the present disclosure should be more clearly understood from the following detailed description when taken in conjunction with the accompanying drawings, in which:

FIG. 1 is a cross-sectional view illustrating an in-wheel motor according to the present disclosure;

FIG. 4 is a perspective view illustrating a cooling channel defined inside the stator housing of the in-wheel motor according to the embodiments of the present disclosure;

Figure 2:
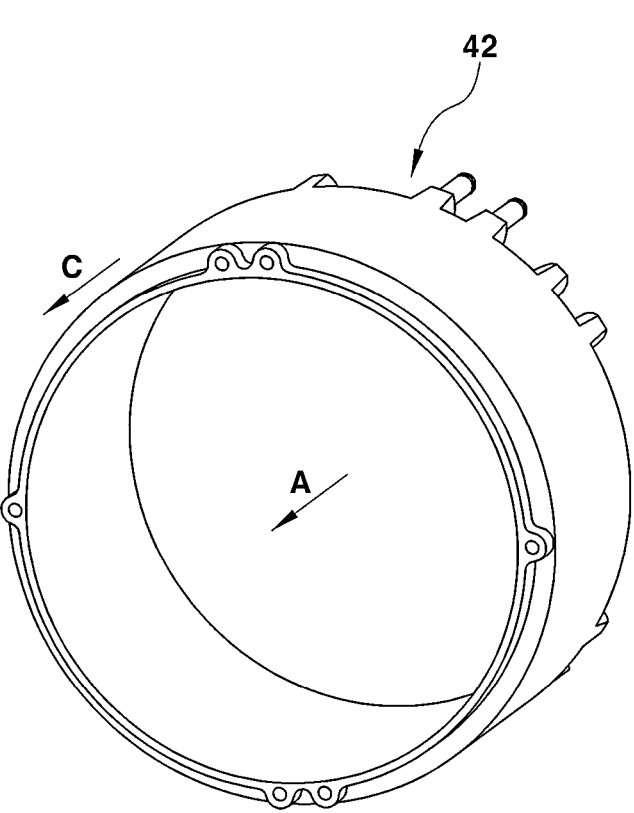
FIG. 2 is a perspective view illustrating the stator housing of the in-wheel motor according to the present disclosure.

The drawings described herein are for illustration purposes only and are not intended to limit the scope of the present disclosure in any way.

DETAILED DESCRIPTION

Specific structural and functional descriptions of embodiments of the present disclosure provided herein are only for illustrative purposes of the embodiments of the present disclosure. The present disclosure may be embodied in many different forms without departing from the spirit and significant characteristics of the present disclosure. In addition, the present disclosure is intended to cover not only the embodiments, but also various alternatives, modifications, equivalents, and other embodiments that may be included within the spirit and scope of the present disclosure.

It should be understood that although the terms "first," "second," and the like may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

When a component, device, element, or the like of the present disclosure is described as having a purpose or performing an operation, function, or the like, the component, device, or element should be considered herein as being "configured to" meet that purpose or to perform that operation or function.

It should be understood that when an element is referred to as being "coupled," "connected," or "linked" to another element, it can be directly coupled or connected to the other element or intervening elements may be present therebetween. In contrast, it should be understood that when an element is referred to as being "directly coupled," "directly connected," or "directly connected" to another element, there are no intervening elements present. Other expressions that explain the relationship between elements, such as "between," "directly between," "adjacent to," or "directly adjacent to" should be construed in the same way.

Throughout the specification, the same reference numerals will refer to the same or like parts. The terminologies used herein are for the purpose of describing particular embodiments only and are not intended to limit the present disclosure. As used herein, singular forms are intended to include plural forms as well, unless the context clearly indicates otherwise. It should be further understood that the terms "comprise," "include," "have," and the like, when used in this specification, specify the presence of stated features, integers, steps, operations, elements, components, and/or combinations thereof but do not preclude the presence or addition of one or more other features, integers, steps, operations, elements, components, and/or combinations thereof.

Hereinafter, the present disclosure should be described in detail with reference to the accompanying drawings.

Figure 1:
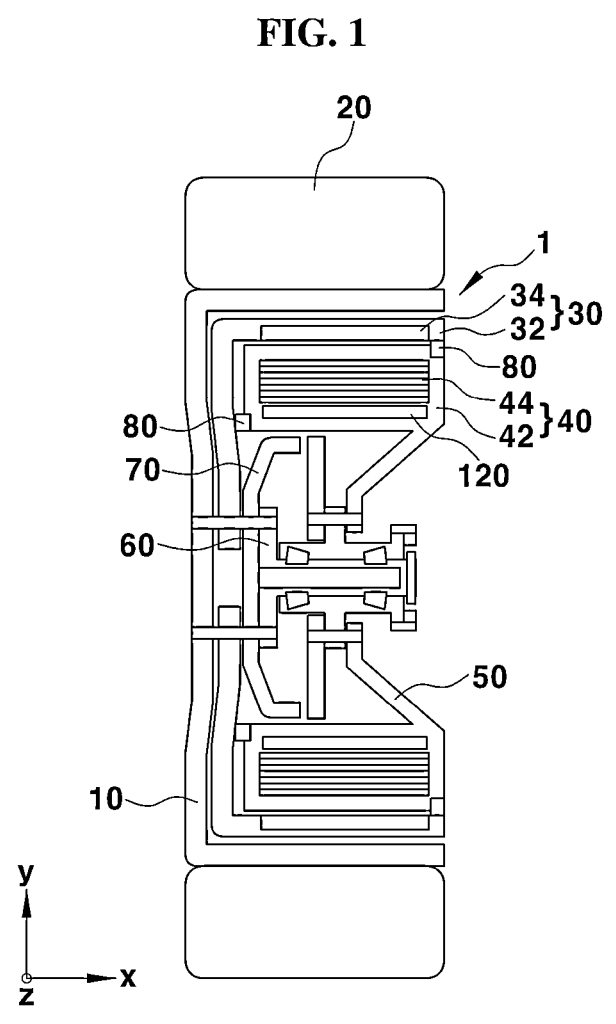

As illustrated in FIG. 1, an in-wheel motor 1 according to the present disclosure is mounted inside a wheel 10 of a vehicle, and a tire 20 is mounted around the wheel 10. In FIG. 1, an x-axis direction indicates the transverse direction of the vehicle, a y-axis direction indicates the vertical direction of the vehicle, and a z-axis direction indicates the longitudinal direction of the vehicle. In addition, in FIG. 1, the left side of the in-wheel motor 1 is outside the vehicle, whereas the right side of the in-wheel motor 1 is inside the vehicle. Thus, the in-wheel motor 1 illustrated in FIG. 1 may be regarded as being a wheel on the driver's side of the vehicle.

The in-wheel motor 1 configured to be rotatable inside the wheel 10 may rotate the wheel 10. In this regard, the in-wheel motor 1 includes a rotor 30 and a stator 40. The rotor 30 is a rotating part and the stator 40 is a fixed part.

In an implementation, the in-wheel motor 1 may be an outer rotor motor in which the rotor 30 is disposed radially outward from the stator 40. The rotor 30 is configured to be rotatable with respect to the stator 40. The rotor 30 includes a rotor housing 32 and a first magnetic member 34 mounted on the rotor housing 32. Being a fixed part, the stator 40 is connected to the vehicle through a support bracket 50. The stator 40 includes a stator housing 42 and a second magnetic member 44 coupled to the stator housing 42.

In some implementations, both the first magnetic member 34 and the second magnetic member 44 may be electromagnets, in which each of the rotor 30 and the stator is wound with a wire into the shape of a coil. In some implementations, one of the first magnetic member 34 and the second magnetic member 44 may be a permanent magnet. In contrast, the other of the first magnetic member 34 and the second magnetic member 44 may be an electromagnet. For example, the first magnetic member 34 may be a permanent magnet, whereas the second magnetic member 44 may be an electromagnet. Hereinafter, the first magnetic member 34 of the rotor 30 is described as being a permanent magnet and the second magnetic member 44 is described as being an electromagnet by way of example.

In response to the magnetization of the second magnetic member 44 of the stator 40, the first magnetic member 34 and the second magnetic member 44 may electromagnetically interact with each other. The rotor 30, including the first magnetic member 34, is configured to be rotatable about an axial direction A of the wheel 10 with respect to the stator 40 that includes the second magnetic member 44. A wheel bearing 60 is configured to couple the wheel 10, the rotor housing 32, and a brake 70 and to be rotatable with respect to the stator 40. The brake 70 is disposed radially outside the wheel bearing 60 and may be operatively coupled to the in-wheel motor 1.

A seal 80 is provided between the rotor 30 and the stator 40. The seal 80 may include an outer seal disposed outward from the wheel 10 of the vehicle when the in-wheel motor 1 is mounted on the vehicle and an inner seal disposed inward from the outer seal. The seal 80 may prevent moisture, foreign matter, and the like from invading into the in-wheel motor 1.

The in-wheel motor 1 includes a cooling structure. The stator housing 42 in FIG. 1 is illustrated in FIG. 2. As illustrated in FIG. 2, "A" indicates the axial direction of the in-wheel motor 1 or the stator housing 42, and "C" indicates the circumferential direction of the in-wheel motor 1 or the stator housing 42.

Figure 3:
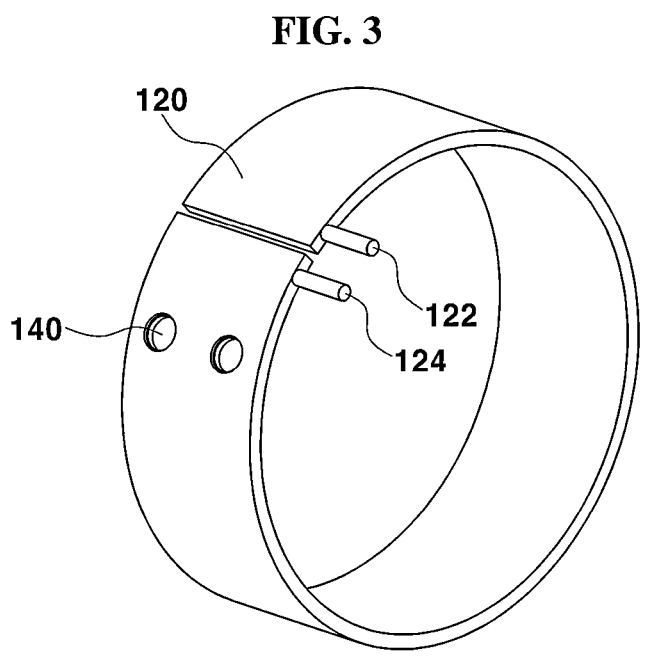
FIG. 3 is a perspective view illustrating a cooling channel defined inside the stator housing of the in-wheel motor according to the embodiments of the present disclosure.

Referring to FIG. 3, according to the embodiments of the present disclosure, a cooling channel 120 is provided inside the stator housing 42. The cooling channel 120, serving as a path through which coolant flows, is defined inside the stator housing 42. The cooling channel 120 allows coolant to flow using an inlet 122 through which coolant enters and an outlet 124 through which coolant exits. As described below, the stator housing 42, including the cooling channel 120, may be fabricated by a casting method using a core. Sealing caps 140 are press-fitted into holes 46 of the stator housing 42 to prevent coolant from leaking. The holes 46 are formed in the stator housing 42 that is produced as a cast product after demolding.

In order to improve cooling performance, the volume or the area of coolant may be increased, or a water jacket structure specially designed to improve cooling performance may be applied. In the former case, the thickness of the cooling channel should be increased. In this case, however, it is required to increase the sizes of components, and thus there may be a problem in that the space is insufficient. In addition, in this case, a space allocated for each part is reduced, which may degrade the performance of the motor. In the latter case, cooling performance is better, but fabrication is difficult.

According to the present disclosure, the stator housing 42, having a cooling structure superior in both cooling performance and fabricability, is provided. Superior cooling performance may be obtained by flowing a coolant using the shape of a cooling channel 220 that is defined by a specially designed core 300. Fabricability may be obtained using core pins 310 provided on the core 300 and sealing caps 500. The core pins 310 may allow the thickness of the cooling channel 220 to be reduced, and the sealing caps 500 may improve a cooling effect.

Figure 4:
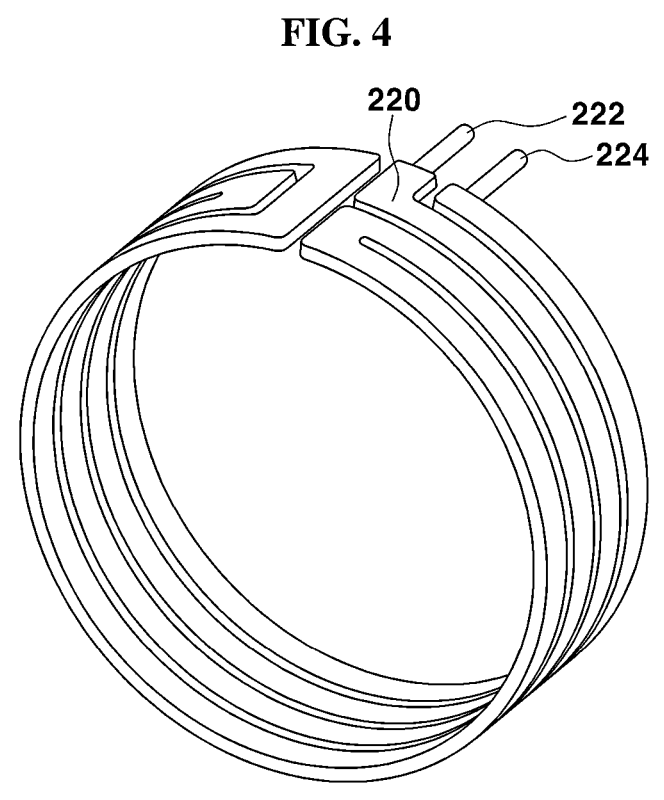
Figure 5:
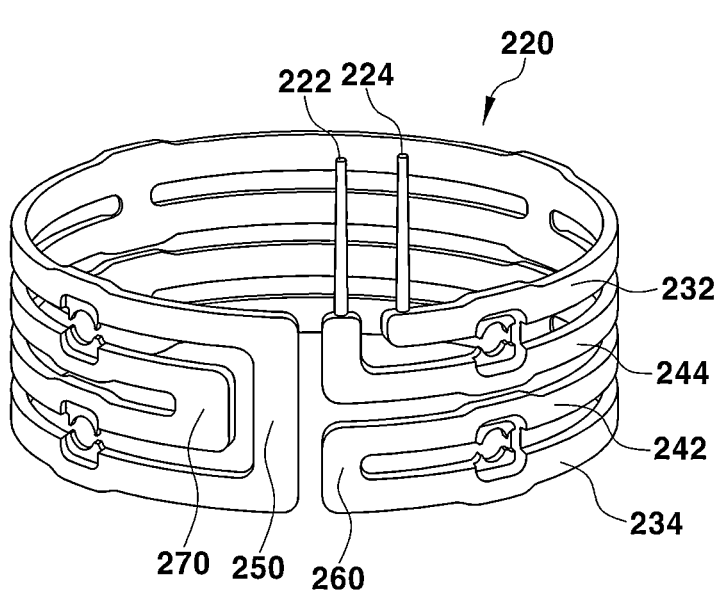
FIG. 5 is a perspective view illustrating a cooling channel inside the stator housing illustrated in FIG. 4.

Specifically, with reference to FIGS. 4 and 5, the cooling channel 220 is formed in the stator housing 42. The cooling channel 220, inside the stator housing 42, is formed as a single continuous structure. In other words, the coolant entered through the inlet 222 exits through the outlet 224 after having passed through the entirety of the cooling channel 220.

The cooling channel 220 has flow paths extending in a variety of directions. The cooling channel 220 may extend in the circumferential direction of the stator housing 42. The cooling channel 220 may also extend in the axial direction of the stator housing 42. The cooling channel 220 may provide the coolant flow paths extending in a variety of directions inside the stator housing 42, i.e., extending in the circumferential direction C and in the axial direction A of the stator housing 42. The cooling channel 220 having this shape may allow the coolant to move while flowing in a variety of positions inside the stator housing 42 or turning in a variety of directions inside the stator housing 42. In this regard, the cooling channel 220 includes a plurality of channel portions 232, 234, 242, 244, 250, 260, and 270.

According to an embodiment of the present disclosure, the cooling channel 220 may include outer channel portions 232 and 234 and inner channel portions 242 and 244. The outer channel portions 232 and 234 and the inner channel portions 242 and 244 are continuously connected to each other in series.

The outer channel portions 232 and 234 include a first outer channel portion 232 extending in the circumferential direction C from a portion of the circumference, i.e., a first side of the stator housing 42. The outer channel portions 232 and 234 also include a second outer channel portion 234 extending in the circumferential direction C of the stator housing 42 i.e., a second side of the stator housing 42 opposite to the first side. The outer channel portions 232 and 234 may be regarded as being disposed close to the outer portion of the stator housing 42.

The first outer channel portion 232 and the second outer channel portion 234 are connected through a first connecting portion 250. The first outer channel portion 232 and the second outer channel portion 234 may extend in the circumferential direction C of the stator housing 42. In contrast, the first connecting portion 250 may extend in the axial direction A of the stator housing 42. Thus, the first outer channel portion 232 and the second outer channel portion 234 are spaced apart from each other by the first connecting portion 250 such that directions of flow of the coolant through the two outer channel portions 232 and 234 may be opposite to each other.

The second outer channel portion 234 is connected to the inner channel portions 242 and 244 through the second connecting portion 260. The inner channel portions 242 and 244 may be disposed between the outer channel portions 232 and 234 and include a first inner channel portion 242 and a second inner channel portion 244.

The first inner channel portion 242 is connected to the second outer channel portion 234 through the second connecting portion 260. The first inner channel portion 242 extends in the circumferential direction C of the stator housing 42. In contrast, the second connecting portion 260 extends in the axial direction A of the stator housing 42. Thus, the direction of flow of the coolant in the cooling channel 220 is changed through the second connecting portion 260. In other words, the coolant may flow through the first inner channel portion 242 in a direction opposite to a direction of flow of the coolant through the second outer channel portion 234.

The first inner channel portion 242 is connected to the second inner channel portion 244. A third connecting portion 270 is provided between the first inner channel portion 242 and the second inner channel portion 244 such that the direction of flow of coolant is changed through the third connecting portion 270. The third connecting portion 270 extends in the axial direction A of the stator 40 from the second inner channel portion 244. In contrast, the second inner channel portion 244, connected to the third connecting portion 270, extends in the circumferential direction C of the stator housing 42.

In other words, the cooling channel 220 is configured such that the coolant flows through the first outer channel portion 232 in a first direction and flows through the second outer channel portion 234 in a second direction opposite to the first direction. The cooling channel 220 is also configured such that the direction of the coolant flowing through the first inner channel portion 242 is changed to the first direction again, and then the direction of coolant flowing through the second inner channel portion 244 is changed to the second direction again. The direction of flow of the coolant may be changed through the connecting portions 250, 260, and 270 forming bends of the cooling channel 220.

In the drawings, a portion connected to the second inner channel portion 244 is indicated as the inlet 222 through which the coolant enters. In contrast, a portion connected to the first outer channel portion 232 is indicated as the outlet 224 where the coolant exits. However, the present disclosure is not limited thereto. Instead, the first outer channel portion 232 may be connected to the inlet 222, and the second inner channel portion 244 may be connected to the outlet 224.

According to an analysis of the stator housing 42 that includes the cooling channel 220 according to the present disclosure, it can be appreciated that the stator housing 42 provides superior cooling performance due to a lower differential pressure and a lower highest coil temperature compared to other housings each including a cooling channel having another structure.

As described above, the stator housing 42 according to the present disclosure may be fabricated by casting using a core. Although it can be appreciated that the stator housing 42 that includes the cooling channel 220 according to the present disclosure has superior cooling performance, it may be difficult to fabricate the stator housing 42. For example, the cooling channel 220 is band shaped, and it is highly probable that the cooling channel 220 may be damaged when extracting the core. In addition, when fabricating the core, even in the case that a connecting portion is formed between the channel portions 232 and 244 or the channel portions 242 and 244 of the cooling channel 220, demolding may not be achieved. In addition, when the connecting portion is formed to obtain the strength of the core 300, the channel portions of the cooling channel 220 may not be separated from each other.

Figure 6:
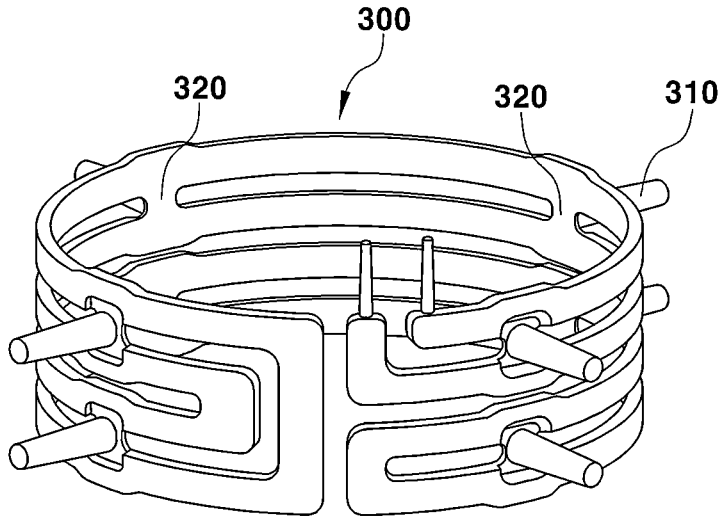
FIG. 6 is a perspective view illustrating a casting core for fabricating the cooling channel illustrated in FIG. 5.

As illustrated in FIG. 6, the present disclosure may overcome such problems, in particular, by forming core pins 310 in the core 300. The core pins 310 are configured to be used in casting and demolding.

In the core 300 for forming the cooling channel 220, the plurality of core pins 310 are formed. The core pins 310 are formed between the first outer channel portion 232 and the second inner channel portion 244 and between the second outer channel portion 234 and the first inner channel portion 242. Although eight (8) core pins 310 are illustrated in the drawings, the number of the core pins is not limited thereto but may be increased or decreased.

The first outer channel portion 232 and the second inner channel portion 244 and/or the second outer channel portion 234 and the first inner channel portion 242 are connected through the connecting portions 320, respectively. The core pins 310 are configured to connect the outer channel portions 232 and 234 through the connecting portions 320, and connect the inner channel portions 242 and 244 through the connecting portions 320. Additionally, the core pins 310 protrude radially outward from the core 300. In an implementation, the connecting portion 320 is configured such that the thickness thereof is smaller than the thickness of each of the inner channel portions 242 and 244 or the outer channel portions 232 and 234.

Fabrication of the stator housing 42 through the core 300, including the core pins 310, is as follows. The stator housing 42 may be fabricated by a casting process using molds and a core by injecting a molten metal material, followed by demolding the core or the like from the cooled stator housing 42.

Figure 7:
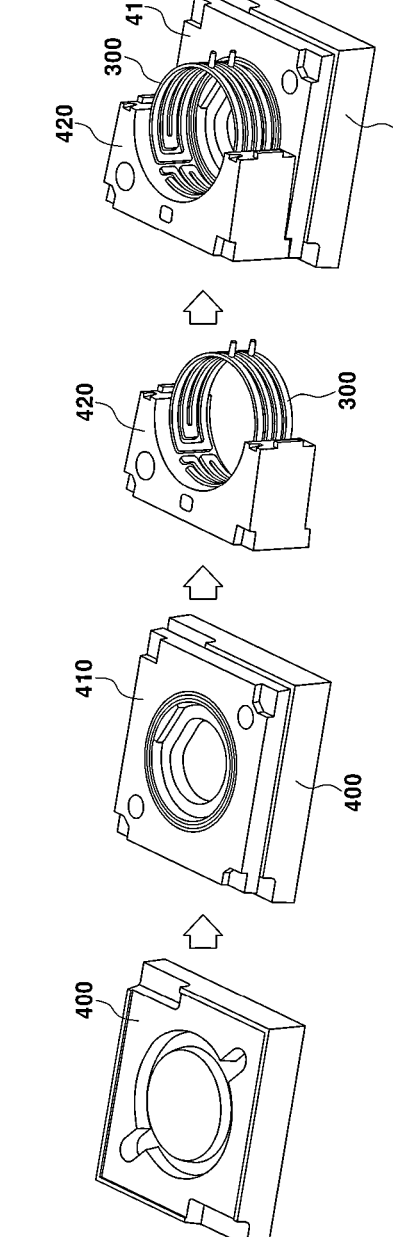
FIGS. 7 and 8 are perspective views illustrating a process of fabricating the stator housing according to the embodiments of the present disclosure.
Figure 8:
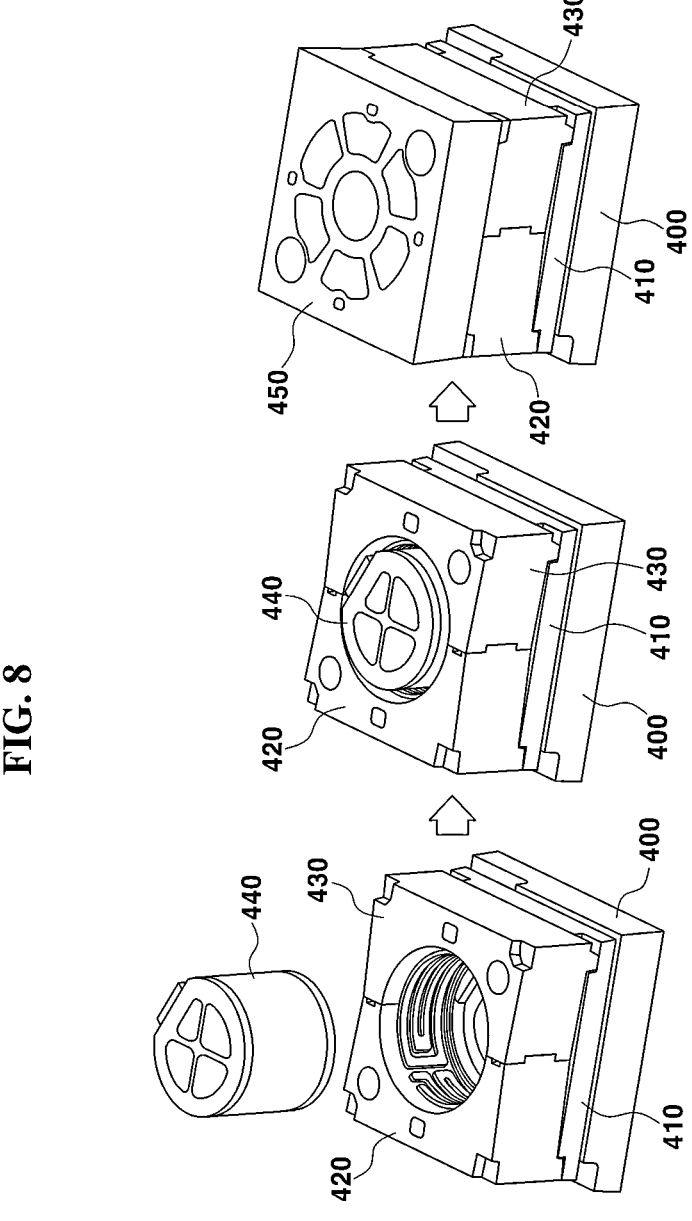

Referring to FIGS. 7 and 8, a lower mold 410 is fitted to a base 400. The core 300 is assembled with a first side mold 420. The core pins 310 may serve to fix the position of the core 300 in the mold. The core 300, fitted to the first side mold 420, is fitted to the lower mold 410. In addition, a second side mold 430 is fitted to the first side mold 420 and the lower mold 410. After a center core 440 for the ring-shaped stator housing 42 is fitted to the interior of the core 300, an upper mold 450 is fitted to the first and second side molds 420 and 430. Also, when the outer molds are assembled and a molten metal is poured into the mold assembly, the stator housing 42 having the cooling channel 220 defined therein as a cast material is formed. Following the casting, the stator housing 42 including the cooling channel 220, as illustrated in FIG. 5, may be produced through demolding.

Figure 9:
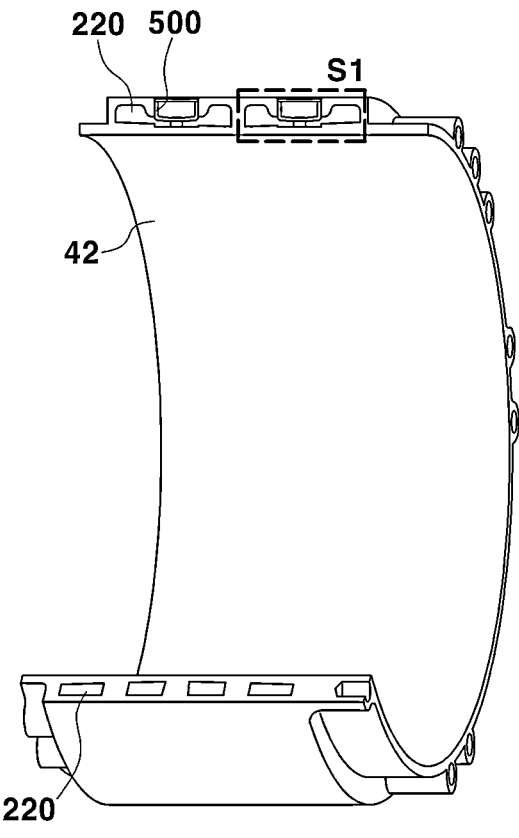
FIG. 9 is a partially cutaway perspective view illustrating the stator housing illustrated in FIG. 4.

As illustrated in FIG. 9, the holes 46 for demolding remain in the stator housing 42. The sealing caps 500 for sealing the holes 46 to prevent the coolant from leaking are mounted on or press-fitted into the stator housing 42. According to the present disclosure, the sealing caps 500 may also serve to divide the cooling channel 220 into the channel portions in addition to sealing the holes 46. In this manner, it is possible to increase the flow-induced cooling effect.

Figure 10:
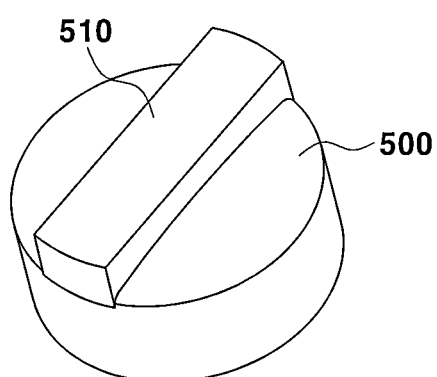
FIG. 10 is a perspective view illustrating the sealing cap illustrated in FIG. 9.
Figure 11:
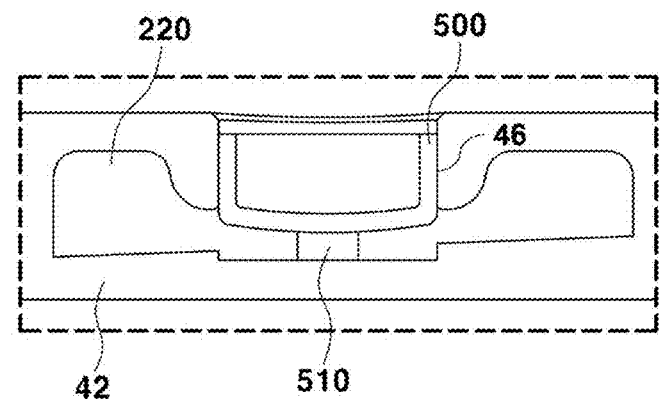
FIG. 11 is an enlarged view illustrating part 51 of FIG. 9.

Specifically, with reference to FIGS. 10 and 11, the sealing caps 500 may seal the holes 46 remaining in the stator housing 42, thereby preventing the coolant flowing in the stator housing 42 from leaking. Moreover, the sealing caps 500 may optimize the cooling performance by preventing flow between the channel portions 232 and 244 or the channel portions 242 and 234. In this regard, each of the sealing caps 500 according to the present disclosure include a blocking member 510. The blocking member 510 may be coupled to the sealing cap 500 while having a band shape. As a non-limiting example, the sealing caps 500 may be formed of a steel material, whereas the blocking members 510 may be formed of a rubber material.

It is possible to prevent flow between the channel portions 232 and 244 or the channel portions 242 and 234 by bringing the sealing cap 500 in contact with the inner surface of the stator housing 42 even when the blocking member 510 is not provided. However, when the depth or load of a press fitting is not suitably managed, the stator housing 42 may be damaged.

Figure 12:
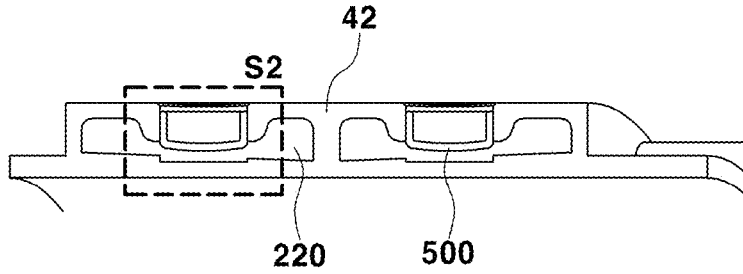
FIG. 12 is a cross-sectional view illustrating a stator housing on which a sealing cap without a blocking member is mounted.
Figure 13:
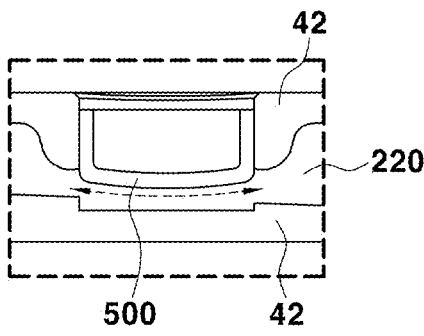
FIG. 13 is an enlarged view illustrating part S2 of FIG. 12.

Specifically, as illustrated in FIGS. 12 and 13, the sealing caps 500 may be press-fitted into the stator housing 42 at a predetermined distance from the inner surface of the stator housing 42 on which the coolant flows so as not to contact the inner surface in order to prevent components, such as the stator housing 42 and the sealing caps 500, from being damaged when the sealing caps 500 are press-fitted into the stator housing 42. In this case, it can be appreciated that the flow area of coolant is reduced. In other words, the coolant flows through the cooling channel 220 below the sealing caps 500 (see arrows in FIG. 13). The blocking member 510 may prevent flow between the channel portions 232 and 244 or the channel portions 242 and 234 on both sides thereof, thereby increasing the flow cross-section of coolant (see FIG. 11).

Figure 14:
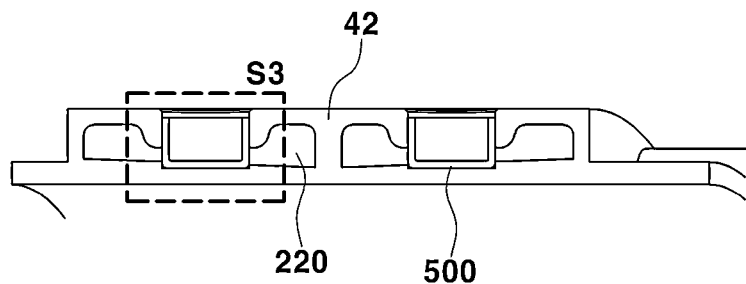
FIG. 14 is a cross-sectional view illustrating a stator housing on which a sealing cap without a blocking member is mounted.
Figure 15:
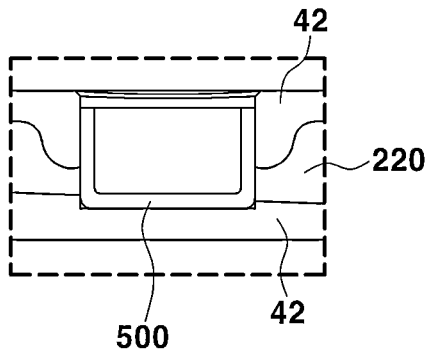
FIG. 15 is an enlarged view illustrating part S3 of FIG. 14.

Referring to FIGS. 14 and 15, when the sealing caps 500 are press-fitted into the stator housing 42 to be in contact with the inner surface of the stator housing 42 in order to prevent the coolant from flowing between the channel portions 232 and 244 or between the channel portions 242 and 234, the stator housing 42 and the sealing caps 500 may be damaged or the flow cross-section of coolant on the bottom end of the sealing caps 500 may be reduced (see a box of dotted lines in FIG. 15). This may disadvantageously increase a differential pressure on fitting portions of the sealing caps 500.

In contrast, the sealing caps 500, each including the blocking member 510, may minimize the reduction in the flow cross-section of the coolant occurring in press fitting to the maximum depth, thereby maximizing the cooling effect. It can be appreciated that the sealing caps 500 increased the flow cross-section of coolant near 20%. Furthermore, the blocking member 510 may be formed of an elastic material to prevent fracture caused by impacts between metal components.

The sealing caps 500 each including the blocking member 510 may eliminate the need to increase the size of the cooling channel to obtain minimum cooling performance. In this manner, the sealing caps 500 may advantageously optimize the layout of the cooling channel, thereby improving the ability to cool the motor.

Although the stator housing 42 has been illustrated as an example in this specification, the housing structure having this cooling channel may be applied to a typical housing, such as the rotor housing 32, which requires cooling.

The present disclosure as set forth herein is not limited to the above-described embodiments and the accompanying drawings. However, it should be apparent to those having ordinary skill in the art that a variety of substitutions, modifications, and changes are possible without departing from the spirit of the present disclosure.

What is claimed is:
1. A channel structure of a motor comprising:
a cooling channel formed in a housing of the motor, wherein a coolant is configured to flow in the cooling channel, wherein the cooling channel is configured to extend by changing direction within the housing and comprises channel portions spaced apart from each other, and wherein the housing is fabricated by casting, and a core in use for forming the cooling channel during the casting has a shape of the cooling channel and includes core pins disposed on a space arranged between the channel portions to connect the channel portions to each other.

2. The channel structure of claim 1, wherein the channel portions of the cooling channel extend in one or more of a circumferential direction and an axial direction of the housing.

3. The channel structure of claim 1, wherein the channel portions include outer channel portions and inner channel portions, wherein the outer channel portions include:

a first outer channel portion extending in a first side of the housing, and a second outer channel portion extending from the first outer channel portion and in a second side of the housing, wherein the inner channel portions extend from the second outer channel portion and extend between the first outer channel portion and the second outer channel portion.

4. The channel structure of claim 3, wherein the outer channel portions and the inner channel portions extend in a circumferential direction of the housing.

5. The channel structure of claim 4, wherein the channel portions further comprise:

a first connecting portion connecting the first outer channel portion with the second outer channel portion; and a second connecting portion connecting the second outer channel portion with the inner channel portions to each other.

6. The channel structure of claim 5, wherein the inner channel portions include:

a first inner channel portion extending from the second connecting portion;

a second inner channel portion extending from the first inner channel portion; and a third connecting portion connecting the first inner channel portion to the second inner channel portion to each other.

7. The channel structure of claim 6, wherein the first connecting portion, the second connecting portion, and the third connecting portion extend in an axial direction of the housing.

8. The channel structure of claim 6, wherein the coolant flows through the first outer channel portion and the first inner channel portion in a first direction and through the second outer channel portion and the second inner channel portion in a second direction opposite to the first direction.

9. The channel structure of claim 3, wherein the coolant enters through one of the outer channel portions and the inner channel portions and, after having passed through the cooling channel, the coolant exits through the other one of the outer channel portions and the inner channel portions.

10. The channel structure of claim 1, wherein the housing comprises a stator housing of a motor.

* * * * *